United States Patent
Ellis

(10) Patent No.: US 6,811,367 B2
(45) Date of Patent: Nov. 2, 2004

(54) BALE FLIPPER AUTOLOADER SYSTEM AND METHOD

(76) Inventor: Danny Joe Ellis, 358 Watts La., Cedar Creek, TX (US) 78612

( * ) Notice: Subject to any disclaimer, the term of this patent is extended or adjusted under 35 U.S.C. 154(b) by 98 days.

(21) Appl. No.: 10/190,000

(22) Filed: Jul. 3, 2002

(65) Prior Publication Data

US 2004/0005208 A1 Jan. 8, 2004

Related U.S. Application Data

(60) Provisional application No. 60/305,112, filed on Jul. 12, 2001.

(51) Int. Cl.[7] .................. B65H 27/00; A01D 85/00; A01D 90/00; B60P 1/04
(52) U.S. Cl. .................. 414/111; 414/24.5; 414/486
(58) Field of Search ................. 414/111, 24.5, 414/789.7, 491, 486, 550, 551, 612

(56) References Cited

U.S. PATENT DOCUMENTS

| | | | | |
|---|---|---|---|---|
| 5,062,757 A | * | 11/1991 | Eichenauer | 414/24.5 |
| 5,211,345 A | * | 5/1993 | Siebenga | 414/111 |
| 6,390,752 B1 | * | 5/2002 | Eiland | 414/111 |
| 6,540,464 B1 | * | 4/2003 | Maclay | 414/111 |
| 6,607,342 B1 | * | 8/2003 | Tolzin | 414/111 |

* cited by examiner

Primary Examiner—Gene O. Crawford
(74) Attorney, Agent, or Firm—Rick B. Yeager

(57) ABSTRACT

A device and method for one-person loading of a multi-bale hay trailer. A bale flipping frame is temporarily attached to a side rail of the hay trailer where it is guided along the side rail in order to position a bale in each bale holding location on the trailer. The mechanism includes a chassis, wheels, and an engine to power a hydraulic system for squeezing the bale from the ends, lifting the bale, flipping the bale above the bale holding location, and releasing the bale. After loading the trailer, the frame automatically disengages to be left in the field or used by another trailer while the full hay trailer is emptied and brought back to repeat the cycle to load additional bales. The mechanism may be transported by pulling it behind the trailer or a truck.

12 Claims, 5 Drawing Sheets

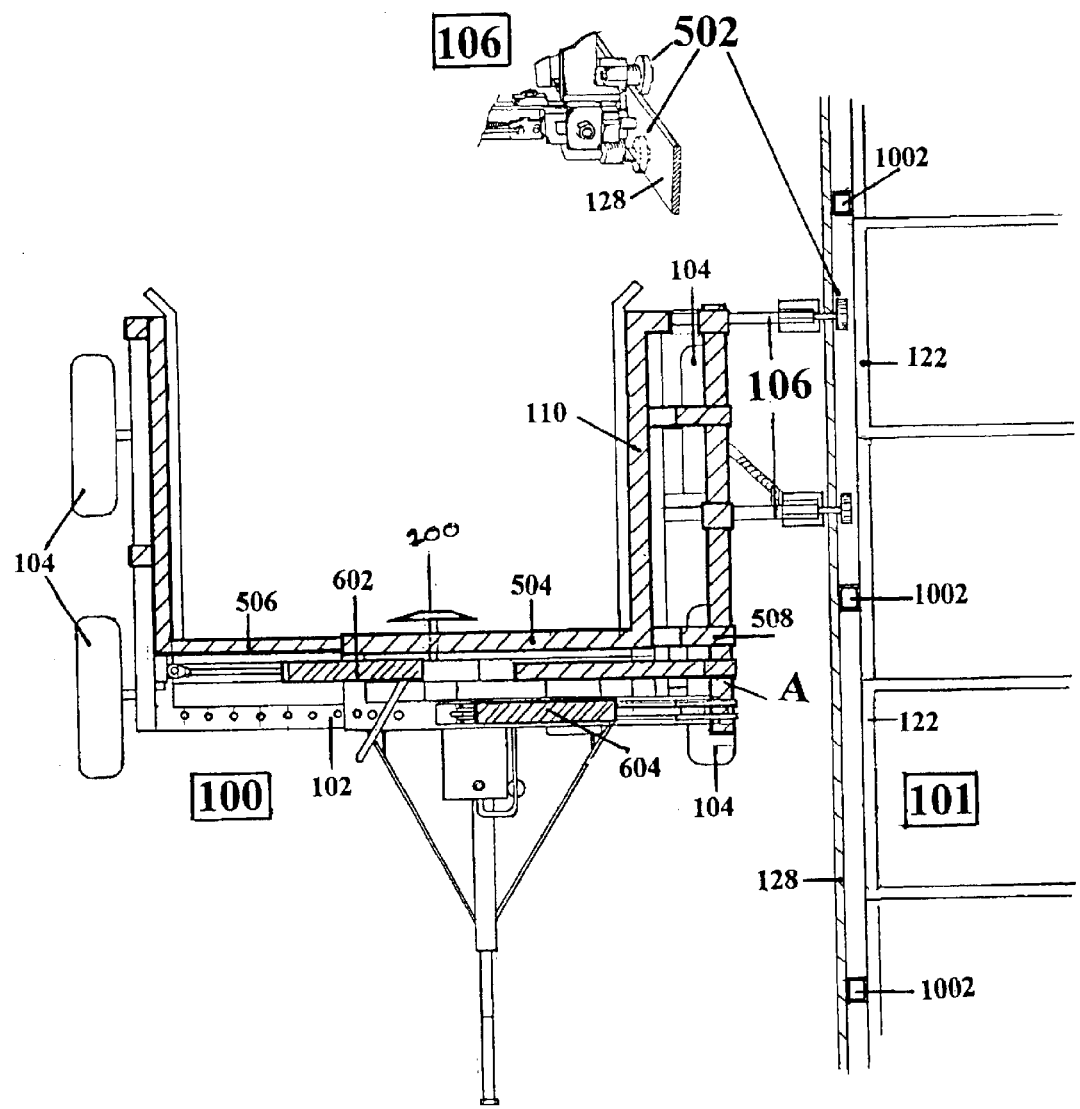
Fig. 2.1

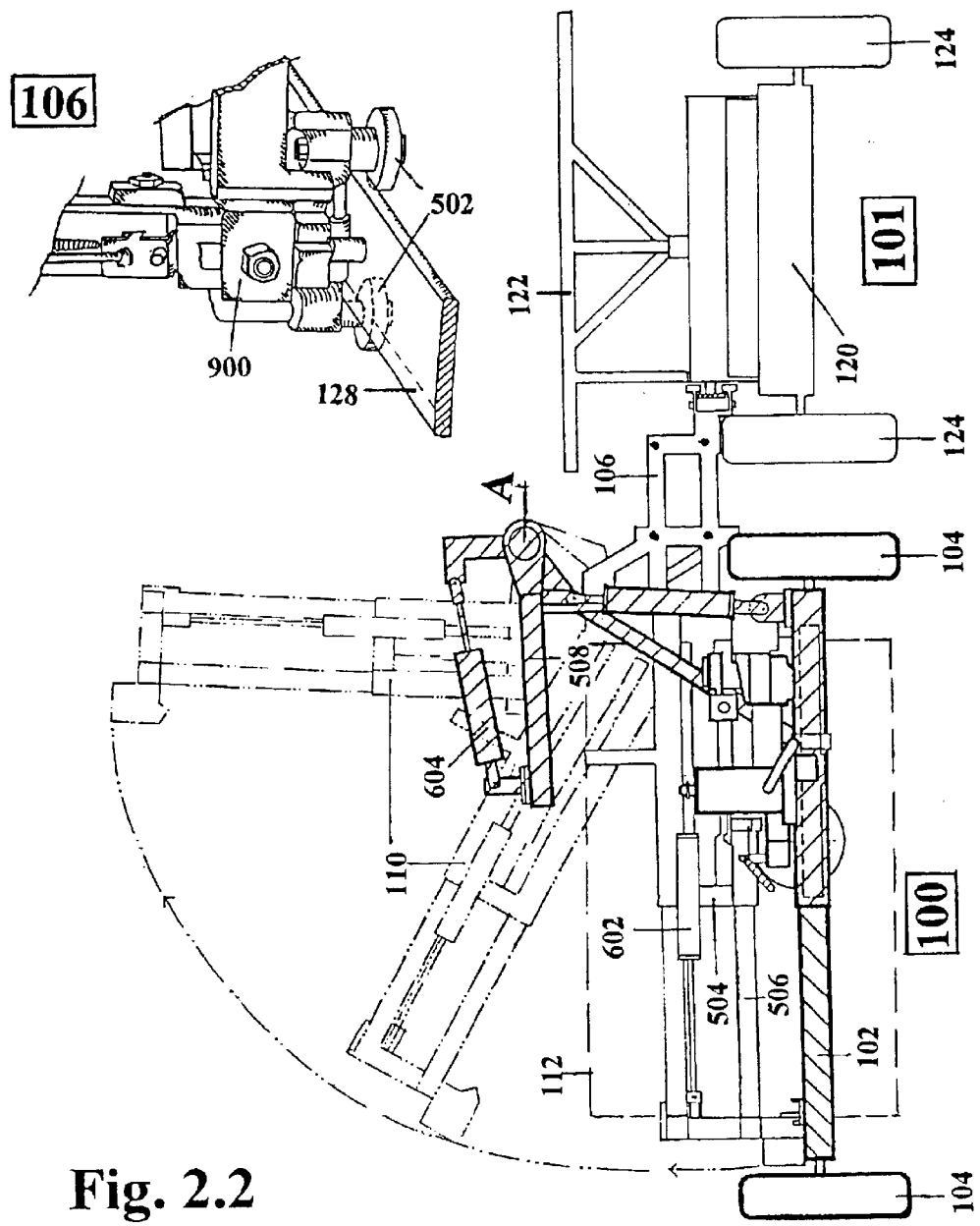
Fig. 2.2

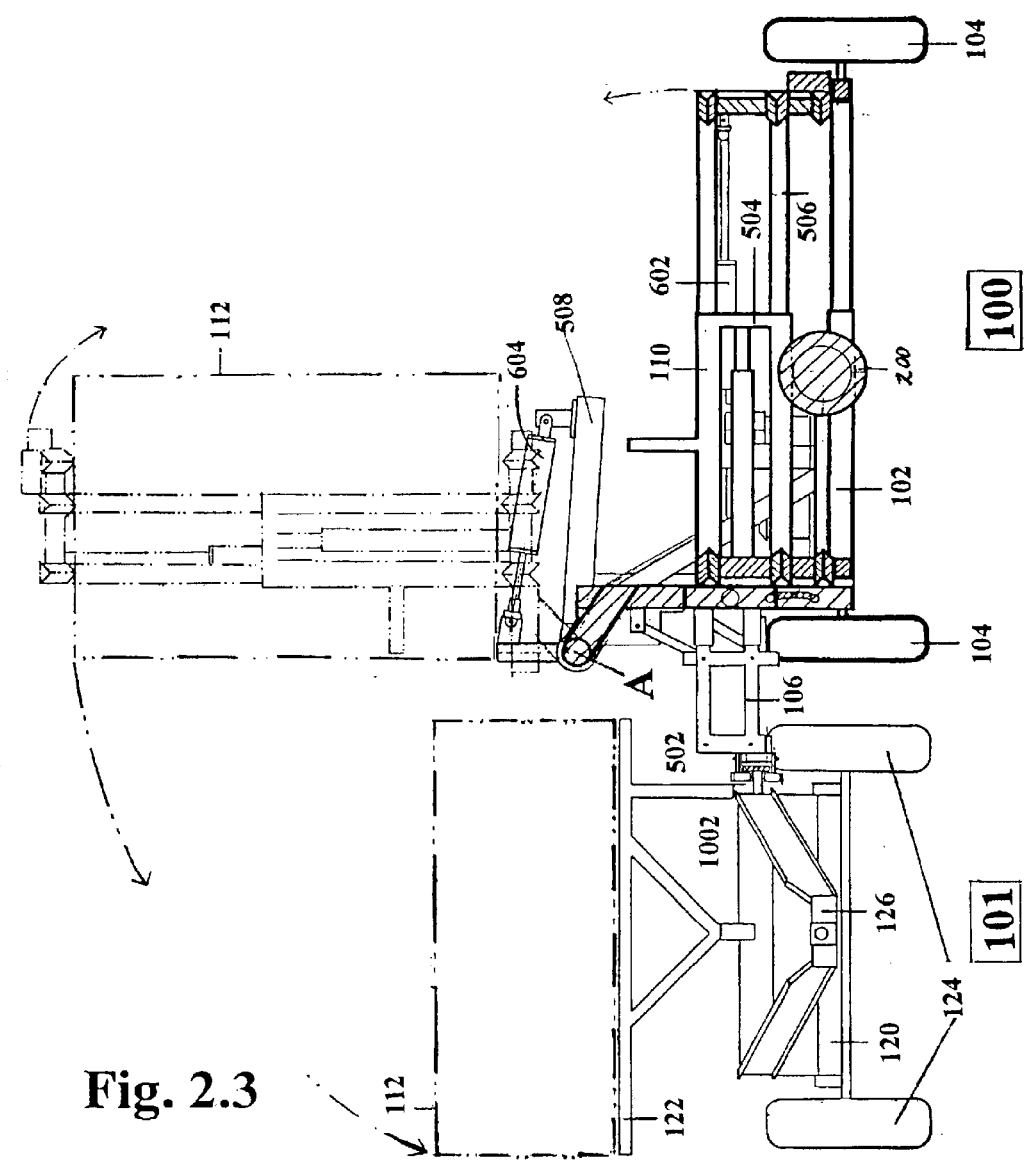
Fig. 2.3

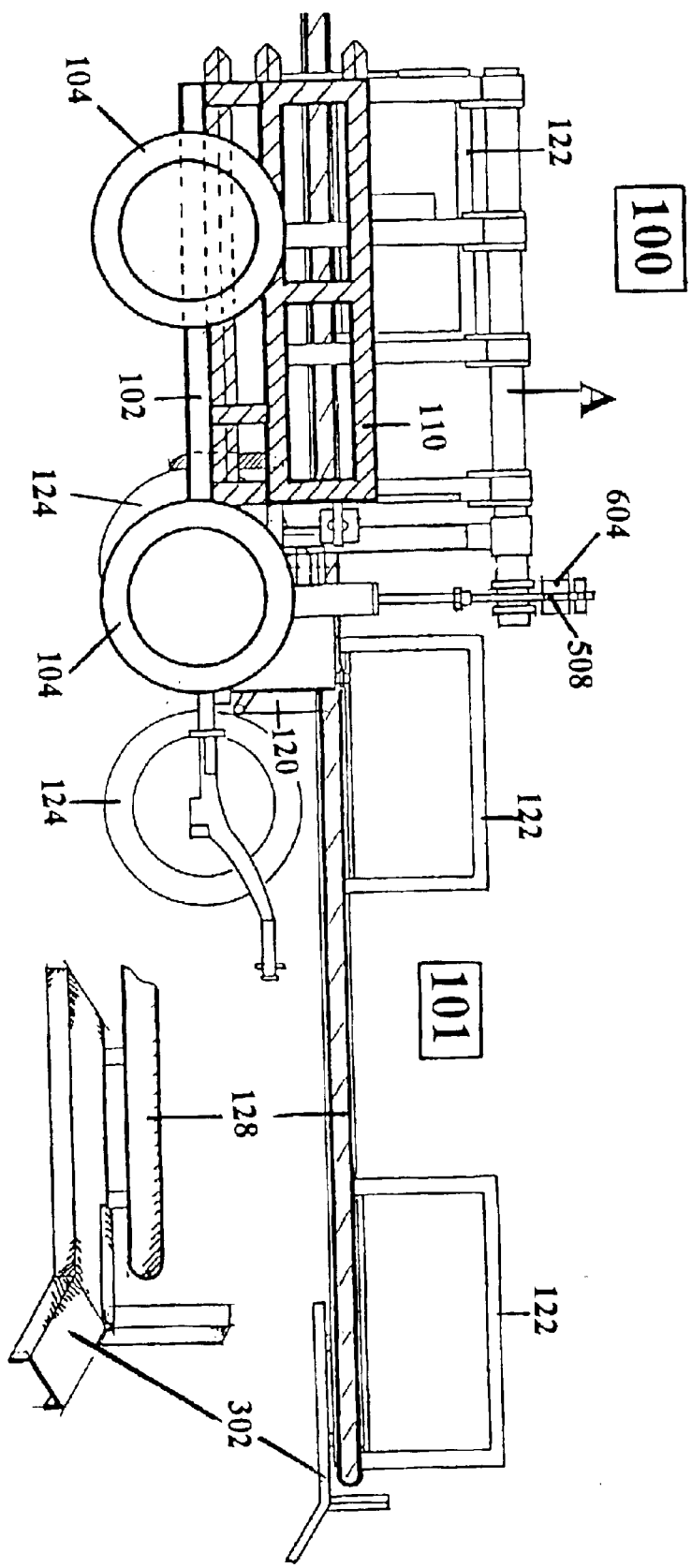
Fig. 2.4

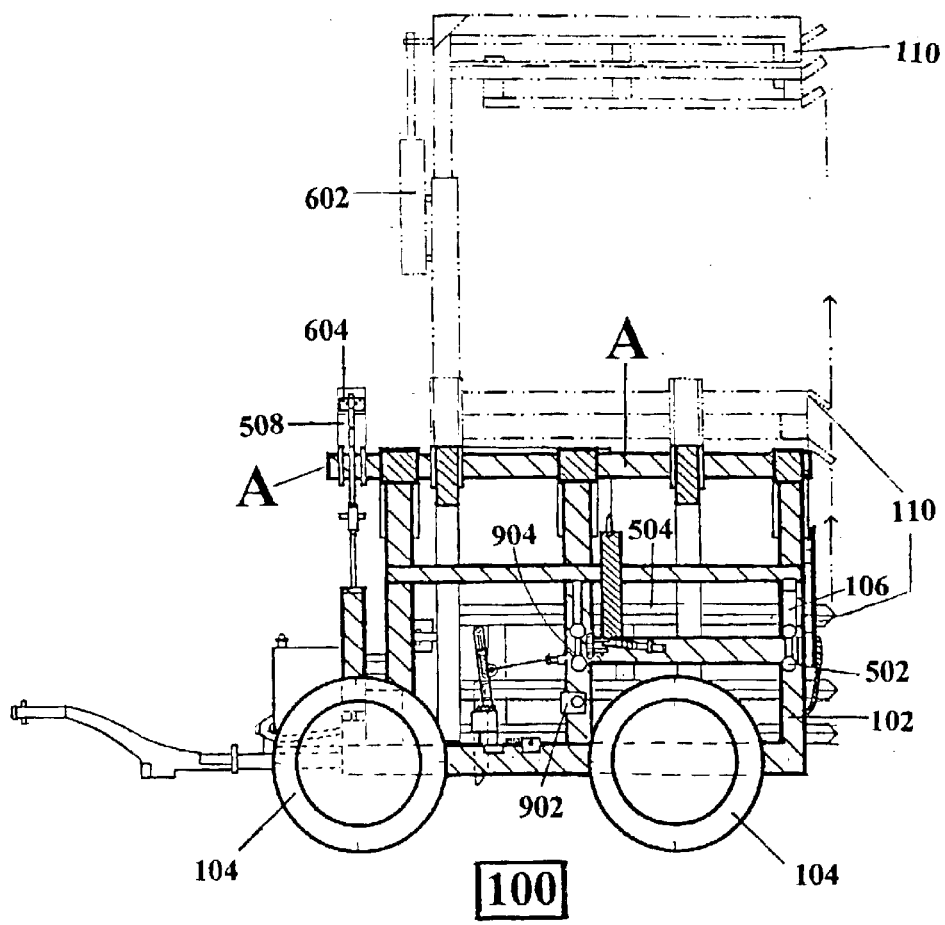
Fig. 2.5

BALE FLIPPER AUTOLOADER SYSTEM AND METHOD

RELATED APPLICATIONS

This application is related to and claims priority from U.S. Provisional patent application No. 60/305,112 filed Jul. 12, 2001.

CROSS-REFERENCE TO RELATED APPLICATIONS

Not applicable

STATEMENT REGARDING FEDERALLY SPONSORED RESEARCH OR DEVELOPMENT

None.

REFERENCE TO A MICROFICHE APPENDIX

Not applicable.

BACKGROUND OF THE INVENTION

Large hay bales are automatically loaded onto a cradle trailer or similar trailer by hydraulic and mechanical features that operate on a side-positioned rail of the trailer to squeeze-grip a bale as the trailer is moved into position alongside the bale and then to flip the bale into place atop the cradle trailer. The cradle trailer and mechanical features of the flipper autoloader operate together when attached to a pickup truck or similar vehicle that pulls the trailer. One person can load hay without the need of a tractor, front-end loader or forklift.

BRIEF SUMMARY OF THE INVENTION

The Bale Flipper Autoloader allows one person to load big bales of hay on a trailer or truck without using a tractor, front-end loader or forklift.

BRIEF DESCRIPTION OF THE SEVERAL VIEWS OF THE DRAWING

FIG. 2.1 is a top view of the bale flipper autoloader feature, illustrating rollers for a sliding connection to a side rail of a cradle trailer and details of the squeeze frame and mechanics of the flipper autoloader mechanisms. FIG. 2.1 contains a top view detail of an auto-attachment assembly of the bale flipper autoloader feature, serving for automatic attachment and detachment of the bale flipper autoloader feature from a side rail of a cradle trailer;

FIG. 2.2 shows a rear end view of the cradle trailer with the front view of the side attached bale flipper autoloader feature as described in FIG. 2.1. FIG. 2.2 also shows the squeeze frame in phantom lines, in different moving positions in reference to the pivot point A.

FIG. 2.3 is a front view of the cradle trailer with side-attached bale flipper autoloader feature illustrating a hay bale located within the feature prior to flipping, being flipped and having been flipped and loaded onto the trailer. FIG. 2.3 shows a front view of the cradle trailer with a rear inside view of the side attached bale flipper autoloader feature, of which the front view is described in FIG. 2.2. The squeeze frame shown in phantom lines indicates the hay bale dropping position of the squeeze frame;

FIG. 2.4 is a side view of a cradle trailer of the type which can be used with the bale flipper autoloader feature, and illustrating the side rail of the cradle trailer for selective attachment of the bale flipper autoloader feature at the side rail during loading of bales atop the trailer. FIG. 2.4 is an outside view of the squeeze frame and a side view of the cradle trailer as described in FIG. 2.1. FIG. 2.4 also shows the attached ramp and guide guard at the rear of the cradle trailer. This feature guides the roller assembly of the bale flipper autoloader feature onto the side rail of the cradle trailer; and FIG. 2.5 is a side view of the bale flipper autoloader feature showing the attachment side to the cradle trailer, with the roller attachment and entire attachment assembly. FIG. 2.5 also shows the squeeze frame in phantom lines in a hay bale dropping position.

DETAILED DESCRIPTION OF THE INVENTION AND DRAWINGS

Referring to FIG. 2.1, a bale flipper autoloader feature 100 includes a frame 102. The frame 102 is connected with rotatable wheels and tires 104, via a chassis and axle arrangement (not shown in detail). Affixed to a side of the frame 102 is an auto-attachment roller and arm assembly 106. As later described, the auto-attachment assembly 106 includes features for selectively attaching and detaching the bale flipper autoloader feature to a side rail 128 of a cradle trailer 101 (auto latch). The frame 102 is also connected with a tongue for attaching the bate flipper autoloader feature 100 with a towing devise, such as a pickup truck tow ball (not shown). When detached from the side rail 128 of the cradle trailer 101, the bale flipper autoloader feature 100 can be separately towed in transit by such a towing device. The bale flipper autoloader feature 100 is also equipped with a squeeze frame 110 within the frame 102. The squeeze frame 110 is later described in detail, but for the present purposed is a structure that can, by hydraulic and mechanical movement means, squeeze and grip a hay bale 112 (shown in FIG. 2.3) within the structure. Depression of a lever 200 initiates the hydraulic squeeze action. As later described, the squeeze frame 110 rotates from the frame 102 by pivoting at the Pivot point A on the side of the auto-attachment assembly, to move the bale 112 within the grip of the squeeze frame 110 over and atop the cradle trailer 101. The squeeze frame 110 automatically releases the bale 112 by means of a connecting link onto the top of the cradle trailer 101 to load the trailer 101 at a cradle 122 thereof. Several cradles 122 are affixed to the top of the chassis frame 120. The several cradles 122 maintain and locate hay bales loaded onto the trailer 101. The chassis frame 120 of the trailer 101 is equipped on one side with a side rail 128. The side rail 128 serves as a guide for the auto-attachment assembly 106 of the bale flipper autoloader feature 100 when the feature 100 is fixed to the trailer 101 during a bale loading operation. The cradle trailer 101 is shown with several latch pin notches (or "detents" herein) 1002 which are engaged by the auto-attachment 106 of the bale flipper autoloader feature 100 as the feature 100 progresses along the trailer 101 from front to back in respective loading operations. The notches 1002 are selectively located along the side rail 128 of the trailer 101, and the auto-attachment assembly 106 is particularly located in position with respect to the entire bale flipper autoloader feature 100, so that engagement of the assembly 106 with each notch 1002 enables selectively positioned loading of each next bale at the respective cradle 122 atop the trailer 101. Likewise, the notches 1002 are arranged to permit the bale flipper autoloader feature 100 to move from front to back of the trailer 101, with the selective engagement, load, and disengagement sequence, so that all cradle 122 locations along the trailer 101 are filled before the feature 100 completely disengages and becomes unattached from the side rail 120 and the trailer 101 altogether.

The bale flipper autoloader feature 100 is detailed, particularly with respect to the auto-attachment assembly 106 and the squeeze frame 110. The auto-attachment assembly 106 is fixed to the frame 102. The frame 102 includes a vertical side adjacent the attachment assembly 106. The vertical side affixes to a squeeze lift arm 508 at the pivot point A, and the squeeze lift arm 508 attaches to the squeeze frame 110. The squeeze frame 110 includes two separate side parts—504 and 506. The side part 504 is sturdily and immovably fixed to the squeeze lift arm 508. The side part 506, however, moves within extensions of the side part 504, in a lateral manner, to allow the side parts 504 and 506 to be brought closer together or spread farther apart, because and within the limitation of the hydraulic movement. The hydraulic movement enables the side parts 504 and 506 to be brought laterally closer together in order to squeeze and grip a hay bale between the parts 504 and 506. The gripped hay bale can then be manipulated by pivot of the squeeze frame 110 to load the bale over and onto the trailer 101 (not shown, but located adjacent the feature 100 in loading operations as shown in prior figures). The auto-attachment assembly 106, as previously mentioned, serves as a guide within the side rail 128 of the trailer 101 (not shown, but attached to the assembly 106 during loading operations, as shown in prior figures). The auto-attachment assembly 106 can include rollers 502 on lateral extensions of the assembly 106. The rollers 502 can fit within the side rail 128 and allows the bale flipper autoloader feature 100 to move from front to back of the trailer 101, alongside the trailer 101 and in fixed lateral relation to it, as next bales are each loaded via the feature 100 onto the trailer 101.

Referring to FIG. 2.2, an engaging mechanism 900 can serve in the auto-attachment assembly 106 to engage the bale flipper autoloader feature 100 with the select detent of the side rail 128 of the trailer 101. The engaging mechanism 900 is spring activated to engage with the select detent as encountered by the mechanism 900 and to disengage from the select detent once the squeeze frame 110 is returned to location at the frame 102 as a next bale is to be intercepted and loaded by the bale flipper autoloader feature 100. The trailer 101 includes a chassis frame 120, with attached axles supporting wheels and tires 124

Referring to FIG. 2.3, the squeeze frame 110 is in a mid-rotation position of its swing as it grips the bale 112 and continues movement about the pivot point A to place the bale 112 on the trailer 101 at the cradle 122. The pivot of the squeeze frame 110 at the pivot point A is driven by a hydraulic cylinder of the feature 100. As the squeeze frame 110 completes its pivot on pivot point A, the bale 112 is located atop the trailer 101 in the cradle 122. Once so located, the squeeze frame 110, via hydraulic action, releases the grip of the bale 122. The squeeze frame 110 then rotates back on pivot point A into place at the frame 102, as shown in FIG. 2.2. The side of squeeze frame 110 trips a latch and applies the brake. The bale flipper autoloader feature 100, as connected to the trailer 101, has been towed (e.g., by a pickup truck that pulls the trailer 101 by a tongue and tow ball of the truck) into position, so that the bale 112 is located between the squeeze frame 110. The squeeze frame 110 includes a hydraulic apparatus to cause the squeeze frame to move together from side to side and to grip the bale 112 between the frame 110 sides. The squeeze frame 110 is attached to the frame 102 via a pivot point A. At the pivot point A, the squeeze frame 110 is rotatable to swing the bale 112 gripped in the frame 110 over and onto the trailer 101 (a movement of 180°). The hydraulic apparatus then reverses, spreads the squeeze frame 110, which releases the bale 112 and returns 180° to home position atop frame 102. The auto-attachment (latch and brake) assembly 106 (as shown in FIG. 2.2) of the frame 102 then disengages from locked engagement with the side rail 128 of the trailer 101. The trailer 101 is then pulled forward (e.g., by the tow pickup or other tow device). As the trailer 101 is pulled forward, the bale flipper autoloader feature 100 slides along the side rail 128 until the auto-attachment assembly 106 encounters a next detent in the side rail 128 of the trailer 101. As a detent is encountered by the assembly 106, a spring triggered bolt of the assembly 106 (shown in detail in FIG.2.2) locks with the detent of the side rail 128. This locking fixes the bale flipper autoloader feature 100 with the trailer 101 and also in respect to a next particular location atop the trailer 101 of a cradle 122 for the next bale. Towing of the trailer 101 (e.g., by a tow pickup) then causes the bale flipper autoloader feature 100 to be towed alongside and with the trailer 101. The trailer 101, and thus the bale flipper autoloader feature 100, can then be towed so that a next hay bale situated on the ground is located between the sides of the squeeze frame 110 of the bale flipper auto loader feature 100. Hydraulics of the feature 100 are then activated via lever 200 depression to, in turn, cause the squeeze frame 110 to squeeze in from the sides to grip the bale and then the squeeze frame 110 to again rotate over and to the trailer 101 via the pivot point A. In this manner, the next bale is placed by the bale flipper autoloader feature 100 in the select cradle 122 atop the trailer 101. Again, the squeeze frame 110 releases the bale in place on the trailer 101, and returns via the pivot to location at the frame 102 of the bale flipper autoloader feature 100. This same sequence progresses until the trailer 101 is fully loaded with hay bales by the bale flipper autoloader feature 100. When the trailer 101 is filled, the auto-attachment assembly 106 of the bale flipper autoloader feature 100 encounters no additional detent of the side rail 128 of the trailer 101. The auto-attachment assembly 106 then is guided and passes from the side rail 128 and the feature 100 is completely disengaged from attachment to the trailer 101. The trailer 101, sans the bale flipper autoloader feature 100, can then be pulled by the towing device (e.g., the pickup truck) to desired location for unloading and storage of the bales and so forth. The chassis frame 120 includes a two tongue 126. The tow tongue 126 is attachable to a towing device, such as a pickup truck equipped with a tow ball.

Referring to FIG. 2.4, the side of the squeeze frame 110, opposite the side rail 128 of the trailer 101 (shown only as the side rail 128), is shown. FIG. 2.4 is a side view illustrating the side rail 128 of the cradle trailer 101 and ramp and guide guard 302 for selective attachment of the bale flipper autoloader feature at the side rail during loading of bales. This feature guides the roller assembly 502 (as shown in FIG. 2.2 detail 106) of the bale flipper autoloader feature 100 onto the side rail 128 of the cradle trailer 101; and Notable in FIG. 2.5 is the trigger assembly 902, which brakes the tire of the bale flipper autoloader feature 100 when the detent is encountered and engaged. Also notable is the trigger assembly 904, which actually engages and, then after return of the squeeze frame 110 after unloading the bale on the trailer 101, disengages with the detent of the side rail 128 of the trailer 101. FIG. 2.5 reflects views of moving portions (in phantom lines) of the bale flipper autoloader feature 100 show details of the hydraulic devises 602 and 604 that permit the squeezing by the sides 504 and 506 of the squeeze frame 110 and the 604 pivot around pivot point A of the frame 102 of the squeeze frame 110 via the squeeze lift arm 508. The hydraulic device 602 causes the side 506 (as shown in FIG. 2.1) to move laterally with respect to an in engagement with the side 504. In this manner, the hydraulic device 602 causes the sides 504, 506 to squeeze and grip a hay bale or, once the bale is placed on a trailer 101, to spread the sides 605, 506 and release the bale atop the trailer 101. The hydraulic device 604 operably contracts once the hydraulic device 602 has caused the sides 504, 506 to satisfactorily squeeze and grip the bale. The device 604 thereby lifts the sides 504, 506 (with gripped bale) over and onto the trailer 101 (as shown in FIG. 2.3) by pivot of the squeeze frame 110 with respect to the frame 102 of the feature 100 at the pivot point A. Once the squeeze frame 110 has released the bale atop the trailer 101, the hydraulic device 602 next extends and pivots the squeeze frame 110 back into position shown in FIGS. 2.1 and 2.3 for gripping of the next hay bale.

What is claimed is:

1. A hay bale flipping apparatus for loading a plurality of hay bales on a trailer, the apparatus comprising
a frame comprising
a trailer attachment mechanism for temporarily attaching the frame to a trailer,
a roller and latch mechanism such that the frame may be rolled with respect to the trailer and then latched in a desired position where the frame may be rolled along with the trailer,
a squeeze frame, such that the squeeze frame may contract to grasp a bale and expand to release a grasped bale, and
a squeeze lift arm for lifting a grasped bale to a position above the trailer; and
a power source for supplying power to squeeze frame and to the lift arm.

2. The hay bale flipping apparatus of claim 1 wherein the trailer attachment mechanism is an auto-attachment roller and arm assembly, such that the auto-attachment roller and arm assembly may be temporarily engaged to a side rail on the trailer, and such that the frame may move along the trailer side rail in order to position bales on the trailer.

3. The hay bale flipping apparatus of claim 1 wherein the roller and latch mechanism further comprises
a chassis;
an axle;
at least two wheels; and
a brake mechanism, such that the brake mechanism may stop the wheels from rotating.

4. The hay bale flipping apparatus of claim 1 wherein the squeeze frame is operated by hydraulic pressure.

5. The hay bale flipping apparatus of claim 1 wherein a squeeze lift arm is operated by hydraulic pressure.

6. The hay bale flipping apparatus of claim 1 wherein the power source is a gasoline engine which supplies hydraulic power to the squeeze frame and to the squeeze lift arm.

7. The hay bale flipping apparatus of claim 1 further comprising
a tongue for attaching the hay bale flipping apparatus to a towing device.

8. The hay bale flipping apparatus of claim 1 further comprising hydraulic and mechanical controls such that
the squeeze frame is mechanically activated to squeeze a bale when the bale is positioned within the squeeze frame;
the squeeze lift arm is mechanically activated to lift a squeezed bale over the trailer after the bale has been squeezed; and
the squeeze frame is mechanically activated to release the bale when the bale is positioned over the trailer.

9. The hay bale flipping apparatus of claim 8 wherein the roller and latch mechanism is mechanically activated to move to a new position after a bale is released onto the trailer.

10. A method of loading bales of hay from a field onto a first trailer the method comprising
providing a hay bale flipping apparatus comprising
a frame comprising
a trailer attachment mechanism for temporarily attaching the frame to the first trailer,
a roller and latch mechanism such that the frame may be rolled with respect to the trailer and then latched in a desired position where the frame may be rolled along with the trailer,
a squeeze frame, such that the squeeze frame may contract to grasp a bale and expand to release a grasped bale, and
a squeeze lift arm for lifting a grasped bale to a position above the trailer; and
a power source for supplying power to squeeze frame and to the lift arm;
temporarily attaching the hay bale flipping apparatus to the first trailer with the trailer attachment mechanism;
pulling the first trailer through the field; and
loading a plurality of bales onto the trailer by
pulling the trailer until a bale is positioned substantially within the squeeze frame, and the squeeze frame is activated to squeeze the ends of the bale;
activating the squeeze lift arm to lift the bale above the trailer;
releasing the bale onto the trailer by releasing the squeeze frame;
lowering the squeeze lift arm; and
allowing the hay bale flipping apparatus to move to the next desired trailer bale position as the trailer is driven.

11. The method of claim 10 further comprising
automatically disengaging the hay bale flipping apparatus from the first trailer after the last bale is loaded onto the first trailer;
temporarily attaching the hay bale flipping apparatus to a second trailer with the trailer attachment mechanism;
pulling the second trailer through the field; and
loading a plurality of bales onto the trailer by pulling the trailer until a bale is positioned substantially within the squeeze frame, and the squeeze frame is activated to squeeze the ends of the bale; automatically
activating the squeeze lift arm to lift the bale above the trailer;
releasing the bale onto the trailer by releasing the squeeze frame;
lowering the squeeze lift arm; and
allowing the hay bale flipping apparatus to move to the next desired trailer bale position.

12. The method of claim 10 further comprising
automatically disengaging the hay bale flipping apparatus from the first trailer after the last bale is loaded onto the first trailer; and
attaching the hay bale flipping apparatus to the rear of the first trailer for transport as the trailer is driven to another location.

* * * * *